(12) United States Patent
Jones et al.

(10) Patent No.: US 9,444,970 B2
(45) Date of Patent: Sep. 13, 2016

(54) APPARATUS AND METHOD FOR MAGNIFYING AN IMAGE

(75) Inventors: Christopher Jones, Manchester (GB); Jason Sotiris Polychronopoulos, San Jose, CA (US); Alasdair Ferro, Cheshire (GB)

(73) Assignee: Mentor Graphics Corporation, Wilsonville, OR (US)

( * ) Notice: Subject to any disclaimer, the term of this patent is extended or adjusted under 35 U.S.C. 154(b) by 1153 days.

(21) Appl. No.: 12/307,655

(22) PCT Filed: Jul. 9, 2007

(86) PCT No.: PCT/GB2007/002559
§ 371 (c)(1),
(2), (4) Date: Jan. 5, 2010

(87) PCT Pub. No.: WO2008/003989
PCT Pub. Date: Jan. 10, 2008

(65) Prior Publication Data
US 2010/0171766 A1 Jul. 8, 2010

(30) Foreign Application Priority Data
Jul. 7, 2006 (GB) .................................. 0613508.1

(51) Int. Cl.
*G06T 3/40* (2006.01)
*H04N 1/393* (2006.01)
*G06T 3/00* (2006.01)

(52) U.S. Cl.
CPC ............. *H04N 1/393* (2013.01); *G06T 3/0018* (2013.01); *G06T 3/40* (2013.01); *G06F 2203/04805* (2013.01); *G09G 2340/045* (2013.01)

(58) Field of Classification Search
None
See application file for complete search history.

(56) References Cited

U.S. PATENT DOCUMENTS

| 5,553,225 | A | 9/1996 | Perry | |
|---|---|---|---|---|
| 5,689,287 | A * | 11/1997 | Mackinlay et al. | 345/427 |
| 2002/0024022 | A1 * | 2/2002 | Kageyama | 250/492.22 |
| 2003/0006995 | A1 | 1/2003 | Smith et al. | |
| 2005/0047629 | A1 * | 3/2005 | Farrell et al. | 382/117 |

FOREIGN PATENT DOCUMENTS

| EP | 0 260 144 | 3/1988 |
|---|---|---|
| JP | 62-222291 | 9/1987 |
| JP | 63-118988 | 5/1988 |
| JP | 01-115785 | 3/1989 |

(Continued)

OTHER PUBLICATIONS

Storey et al., "Graph Layout Adjustment Strategies", Jun. 17, 2005, Proceedings of Graph Drawing 1995, pp. 487-499.*

(Continued)

*Primary Examiner* — Matthew Salvucci
(74) *Attorney, Agent, or Firm* — Klarquist Sparkman, LLP

(57) ABSTRACT

An apparatus for magnifying an image. The apparatus comprises magnification means arranged to magnify part of the image, to form a magnified image portion and an unmagnified image portion. Said magnified and unmagnified image portions together contain all the image information contained within the image. At least part of the magnified image portion and at least part of the unmagnified image portion are within a visible image portion and the magnified image portion does not obscure the unmagnified image portion. A method of magnifying an image is also provided.

35 Claims, 10 Drawing Sheets

(56) References Cited

FOREIGN PATENT DOCUMENTS

Figure 1:
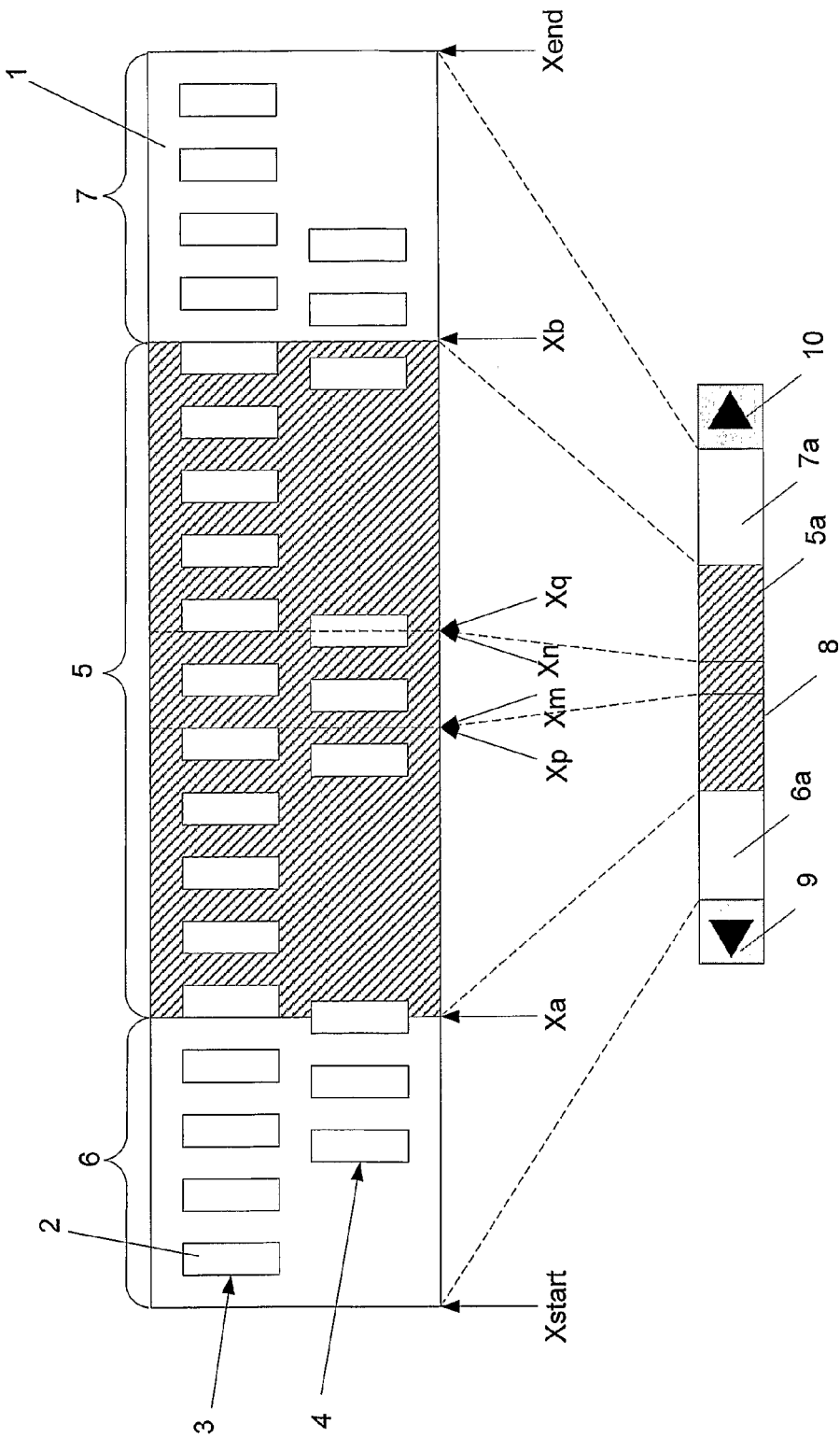

| JP | 04-106668 | 4/1992 |
|----|-----------|--------|
| JP | 06-274586 | 9/1994 |
| JP | 2005-515479 | 5/2005 |

OTHER PUBLICATIONS

International Search Report for International Patent Application No. PCT/GB2007/02559, Nov. 1, 2007.
Carpendale, M.S.T.; "A Framework for Elastic Presentation Space," Thesis, Simon Fraser University, Mar. 1999 (abstract).
Notification of Reasons(s) for Refusal, Japan Patent Application No. 2009-517436, Dec. 1, 2011, 4 pages.
Examination Report for European Application No. 07 766 177.5-1228, dated May 7, 2009, 4 pages.
English translation of Notification of Refusal, JP2009-517436, dated Jul. 12, 2012, 4 pages.
English translation of 1st Office Action, CN200780030178.9, dated Feb. 24, 2011, 8 pages.
English translation of 2nd Office Action, CN200780030178.9, dated Mar. 16, 2012, 3 pages.
English translation of 3$^{rd}$ Office Action, CN200780030178.9, dated Oct. 9, 2012, 7 pages.
Summons to Attend Oral Proceedings for European Application No. 07766177.5, dated Dec. 23, 2015, 5 pages.

* cited by examiner

APPARATUS AND METHOD FOR MAGNIFYING AN IMAGE

CROSS REFERENCE TO RELATED APPLICATIONS

This is the U.S. National Stage of International Application No. PCT/GB2007/002559, filed Jul. 9, 2007, which was published in English under PCT Article 21(2), which in turn claims the benefit of British Patent Application No. 0613508.1, filed Jul. 7, 2006.

The present invention relates to an apparatus and method for magnifying an image.

It is known to enlarge images. Image enlargement can be considered to be subdivided into two kinds. In a first kind of enlargement, referred to herein as zooming, either the whole image or part of an image is enlarged such that the enlarged image or portion completely fills a visible image portion (i.e. no portions of the image that are not zoomed are visible). In a second kind of enlargement, referred to herein as magnification, part of an image is enlarged, such that both the magnified portion (i.e. the enlarged portion) and unmagnified portions (i.e. at the original scale) of the image are within a visible image portion. For magnification the proportions of magnified and unmagnified image portions in the visible image portion can vary. Zooming can be considered to be a special case of magnification in which the proportion of the or each unmagnified image portion in the visible image portion has been reduced to zero.

Magnification can be implemented using optical lenses. For instance, magnification can be performed using a magnifying glass. A magnifying glass comprises a single convex lens, which produces a magnified image of part of an object. A magnifying glass is a simple form of optical microscope and works by creating a magnified virtual image of an object behind the lens. The distance between the lens and the object must be shorter than the focal length of the lens for this to occur.

Alternatively, it is known to implement image magnification in software. A screen magnifier is a piece of software that interfaces with a computer's graphical output to present enlarged screen content. A magnified portion of the original screen content is displayed on a computer monitor, (or another type of graphical output from the computer), such that the magnified portion covers some of, or the entire, screen. The magnified portion contains the content that is of interest to a user and a pointer or cursor. The user may move the pointer or cursor around the screen, and the screen magnifier alters the enlarged portion to track the pointer or cursor.

However, a problem with conventional magnifying glasses, screen magnifiers and other forms of magnifiers is that the magnified image portion obscures part or all of the unmagnified image portions. Specifically, portions of the image immediately surrounding the magnified image portion are obscured. This is particularly disadvantageous, as it is likely to be the case that portions of the image immediately surrounding the magnified image portion are of greater interest than those portions of the image further away from the magnified image portion. Furthermore, the obscured portions of the image mean that there is an inconsistent amount of data within the image displayed within the visible area, compared with the same visible image portion without a magnified portion.

Alternatively, for known forms of zooming, no unmagnified part of the image is visible within the visible image portion, with the result that the context of the zoomed image portion is lost.

It is an object of the present invention to obviate or mitigate one or more of the problems of the prior art, whether identified herein or elsewhere.

According to a first aspect of the present invention there is provided an apparatus for magnifying an image, the apparatus comprising magnification means arranged to magnify part of the image to form a magnified image portion and an unmagnified image portion, said magnified and unmagnified image portions together containing all the image information contained within the image, wherein at least part of the magnified image portion and at least part of the unmagnified image portion are within a visible image portion and the magnified image portion does not obscure the unmagnified image portion.

An advantage of the first aspect of the present invention is that by ensuring that the magnified image portion does not obscure the unmagnified image portion areas of the image of particular interest can be magnified without losing information relating to the context of the magnified image portion within the whole image.

Preferably, the apparatus further comprises display means arranged to display the visible image portion.

The whole of the magnified image portion may be within the visible image portion. The visible image portion may comprise the magnified image portion and first and second unmagnified image portions. The magnified image portion may be located between said first and second unmagnified image portions. The visible image portion may be moveable within said image. The magnified image portion may be moveable within said visible image portion.

The magnification means may be arranged to magnify said part of the image in a first direction. Alternatively, the magnification means may be arranged to magnify said part of the image in a first direction and a second direction. The second directions may be orthogonal to the first direction. Said part of the image may be magnified by different amounts in said first direction and said second direction.

Said magnified image portion may be rectangular. Alternatively, magnified image portion may be substantially elliptical.

The or each unmagnified image portion may be moved relative to the magnified image portion such that within the visible image portion the magnified image portion does not obscure the or each unmagnified image portion.

The apparatus may further comprise means for presenting the image and means for receiving a user specification of a part of the presented image to be magnified; wherein the magnification means is arranged to use said user specification to generate said magnified and unmagnified image portions and wherein said presented image comprises a first quantity of information, and said visible image portion comprises a second lesser quantity of information.

Said first and second unmagnified image portions may be moved by different amounts relative to the magnified image portion.

The or each unmagnified image portion may be compressed within said visible image portion such that within the visible image portion the magnified image portion does not obscure the or each unmagnified image portion. Said first and second unmagnified image portions may be compressed by different amounts. The or each unmagnified image portion may be compressed by a greater or lesser amount further away from the magnified image portion. The or each unmagnified image portion may only be compressed over part of said part of the unmagnified image portion within the visible image portion.

The image may comprise an array of data. The array of data may be linear. The image may comprise a time line. The time line may be suitable for use within a simulation system.

According to a second aspect of the present invention there is provided a method for magnifying an image, the method comprising: magnifying part of the image to form a magnified image portion and an unmagnified image portion, said magnified and unmagnified image portions together containing all the image information contained within the image; wherein at least part of the magnified image portion and at least part of the unmagnified image portion are within a visible image portion and the magnified image portion does not obscure the unmagnified image portion.

The method preferably further comprises displaying the visible image portion.

The whole of the magnified image portion may be within the visible image portion. Said visible image portion may comprise the magnified image portion and first and second unmagnified image portions. The magnified image portion may be located between said first and second unmagnified image portions.

The method may further comprise moving the visible image portion within the image. The method may further comprise moving the magnified image portion within the visible image portion.

The method may further comprise magnifying said part of the image in a first direction. The method may further comprise magnifying said part of the image in a first direction and a second direction. The method may further comprise magnifying said part of the image by different amounts in said first direction and said second direction.

Said magnified image portion may be rectangular. Alternatively, said magnified image portion may be substantially elliptical.

The method may further comprise moving the or each unmagnified image portion relative to the magnified image portion such that within the visible image portion the magnified image portion does not obscure the or each unmagnified image portion.

The method may further comprise presenting the image; and receiving a user specification of a part of the presented image to be magnified; wherein magnifying part of the image comprises using said user specification to generate said magnified and unmagnified image portions and wherein said presented image comprises a first quantity of information, and said visible image portion comprises a second lesser quantity of information.

The method may further comprise moving said first and second unmagnified image portions by different amounts relative to the magnified image portion.

The method may further comprise compressing the or each unmagnified image portion within said visible image portion such that within the visible image portion the magnified image portion does not obscure the or each unmagnified image portion.

The method may further comprise compressing said first and second unmagnified image portions by different amounts.

The method may further comprise compressing the or each unmagnified image portion by a greater or lesser amount further away from the magnified image portion.

The method may further comprise compressing the or each unmagnified image portion only over part of said part of the unmagnified image portion within the visible image portion.

According to a third aspect of the present invention there is provided a carrier medium carrying computer readable code for controlling a computer to carry out the method described above.

According to a fourth aspect of the present invention there is provided computer apparatus for magnifying an image, the apparatus comprising: a program memory storing processor readable instructions; and a processor configured to read and execute instructions stored in said program memory; wherein the processor readable instructions comprise instructions controlling the processor to carry out the method described above.

Figure 2:
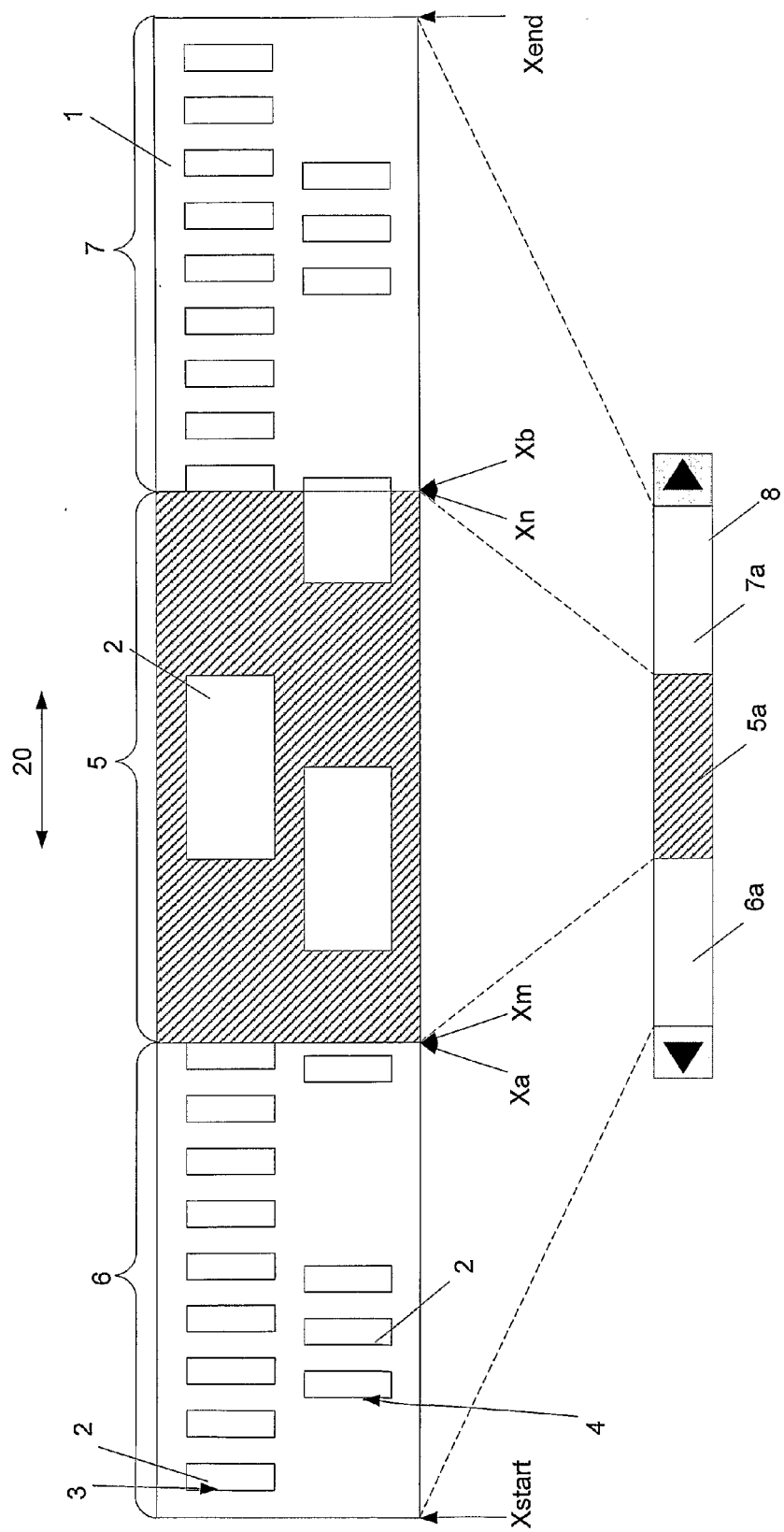
Figure 3:
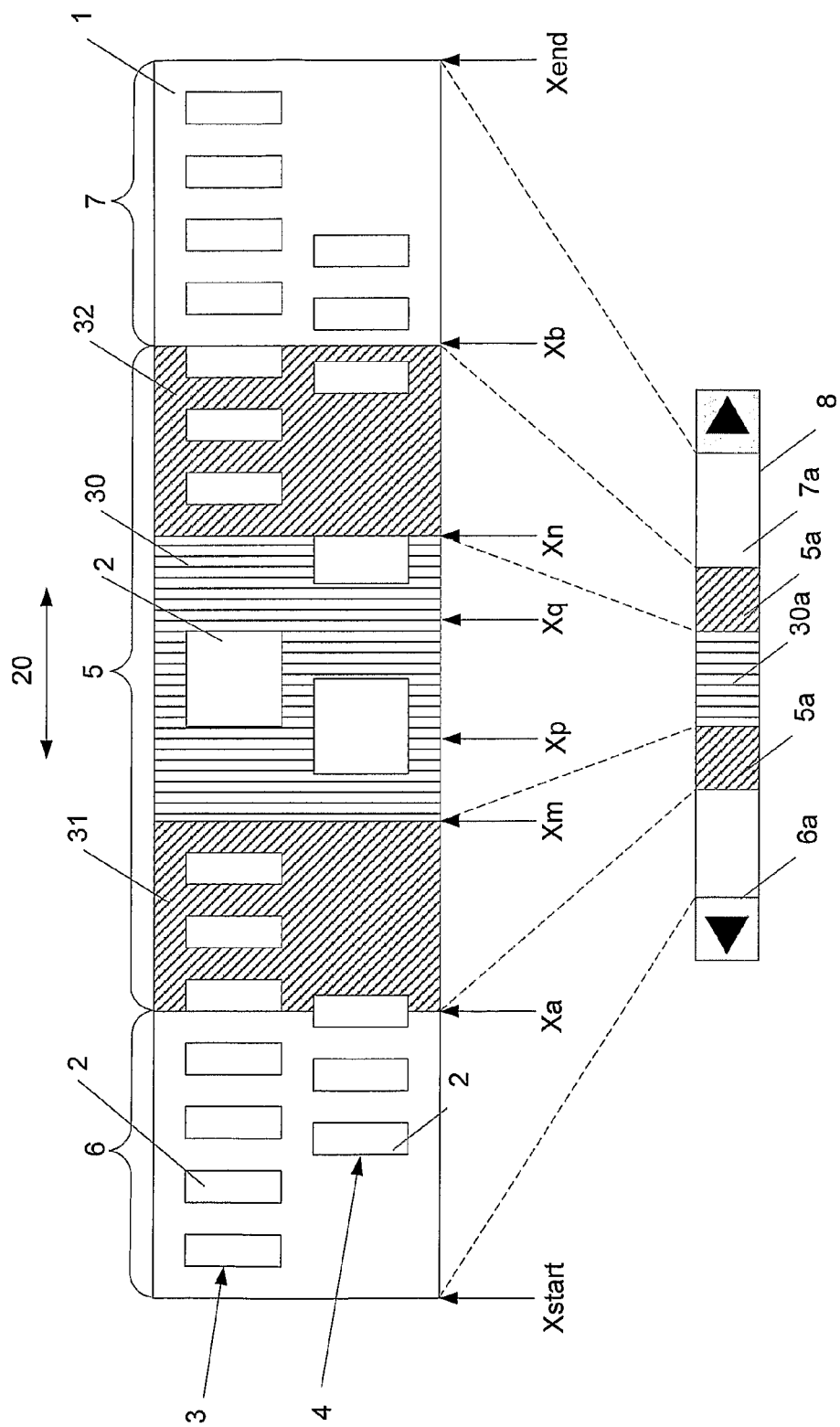
Figure 4:
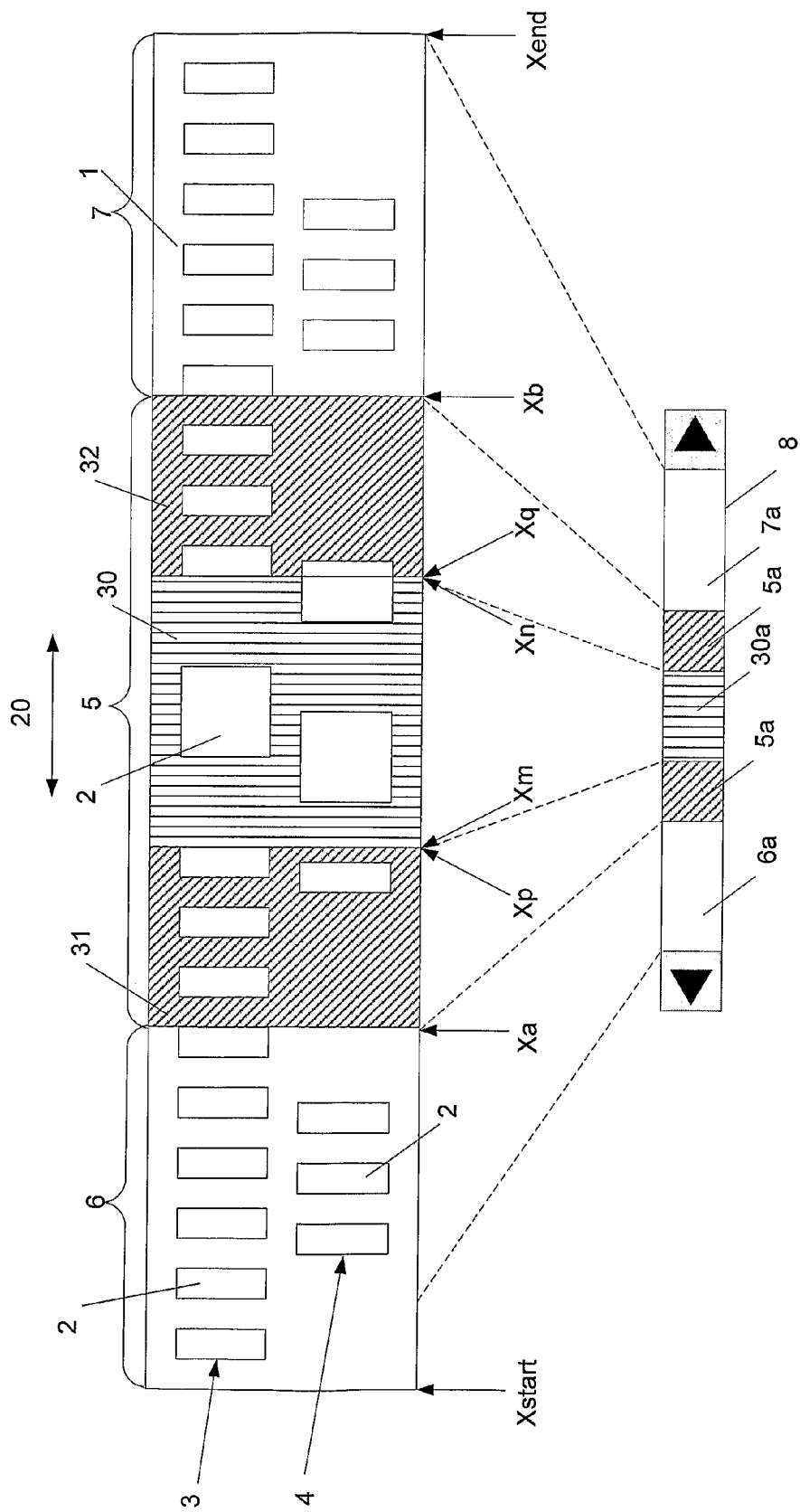
Figure 5:
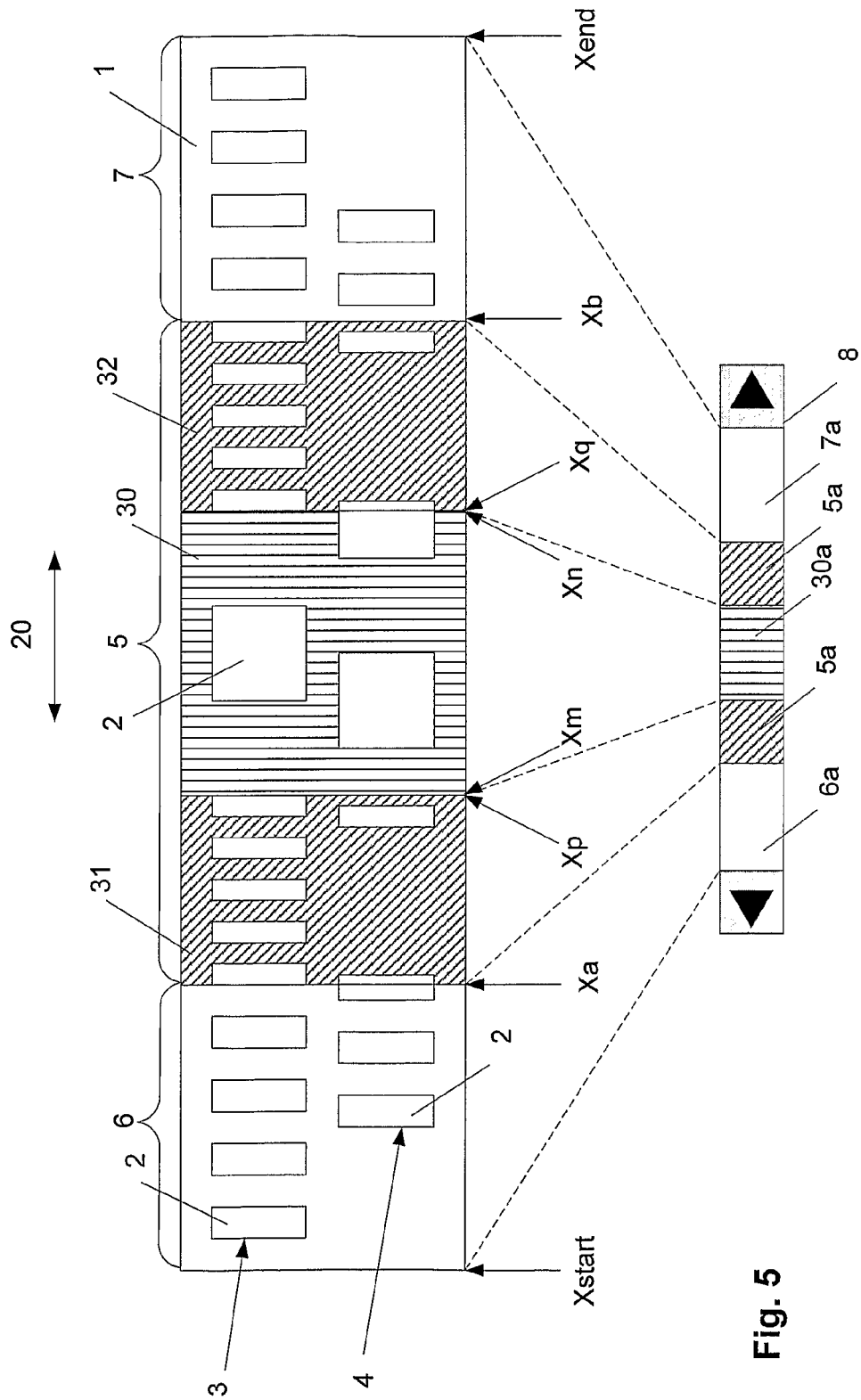
Figure 6:
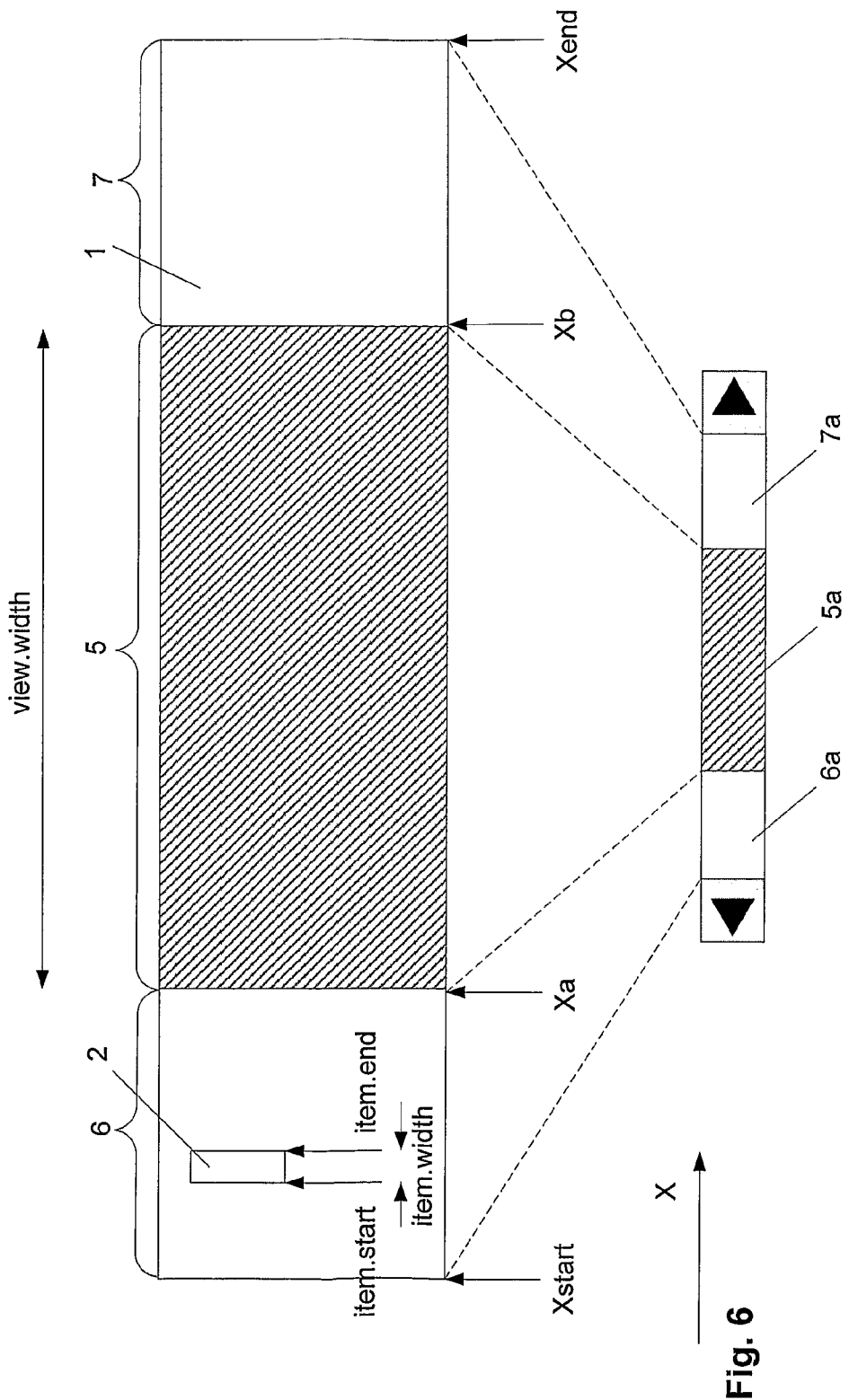
Figure 7:
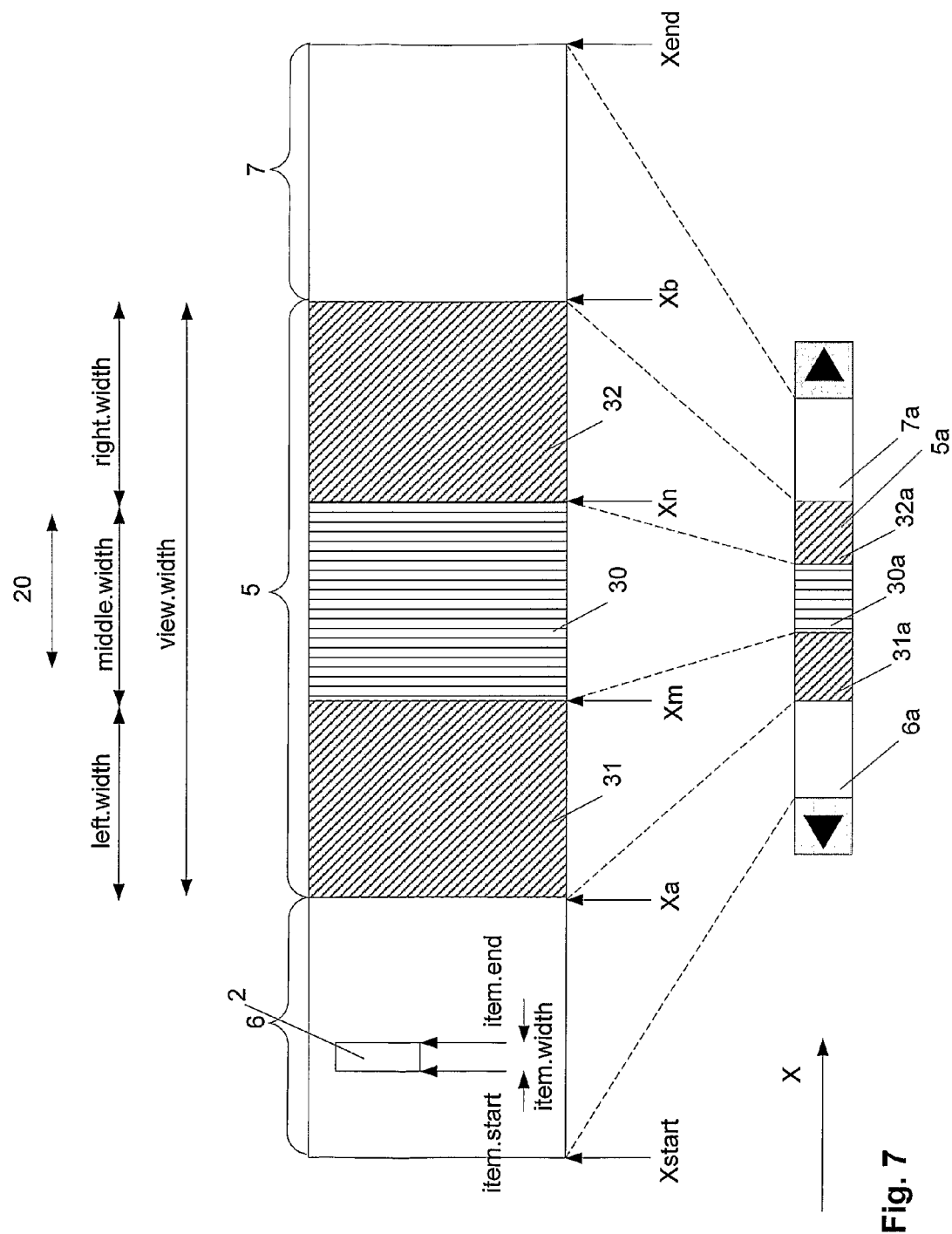
Figure 8:
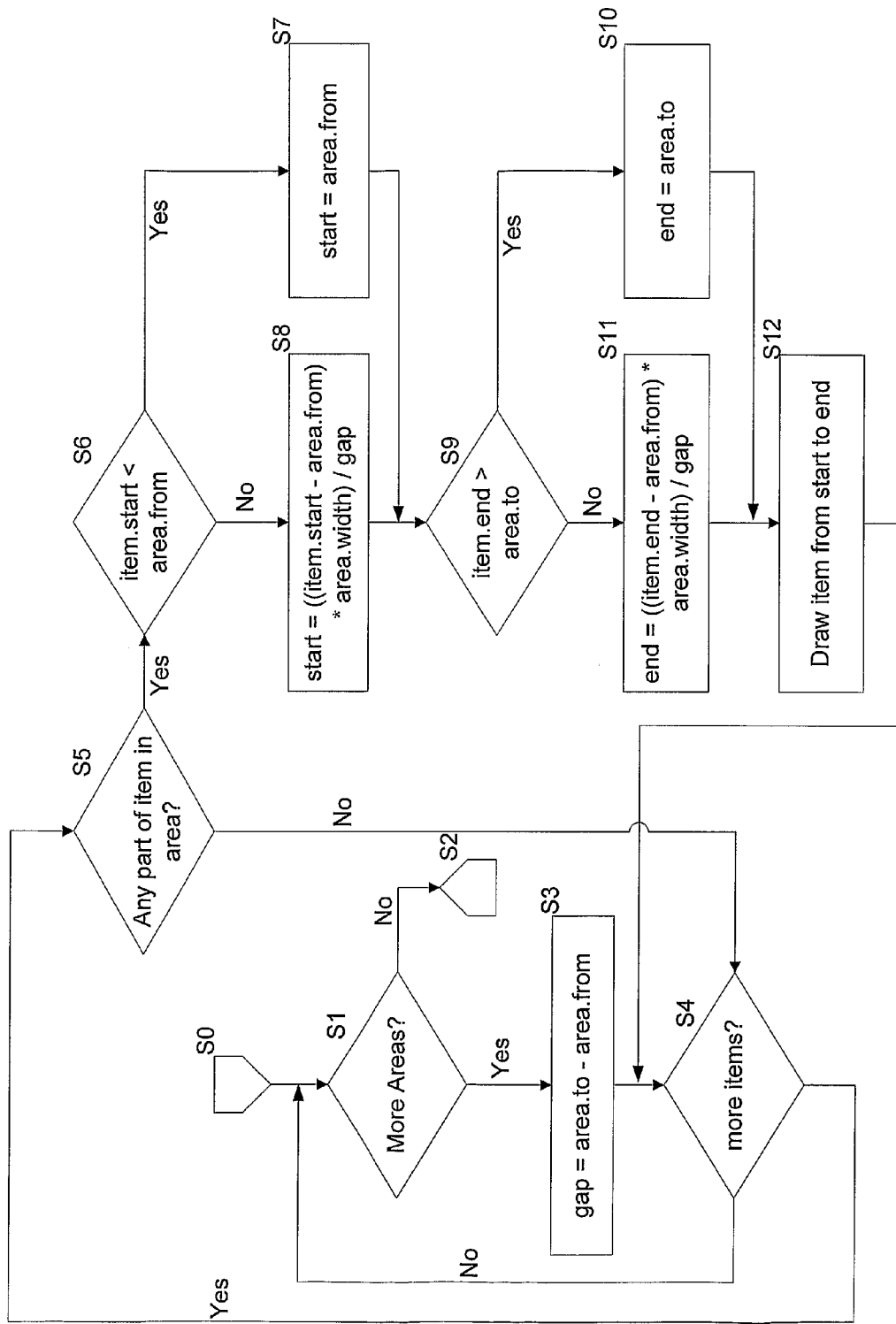
Figure 9:
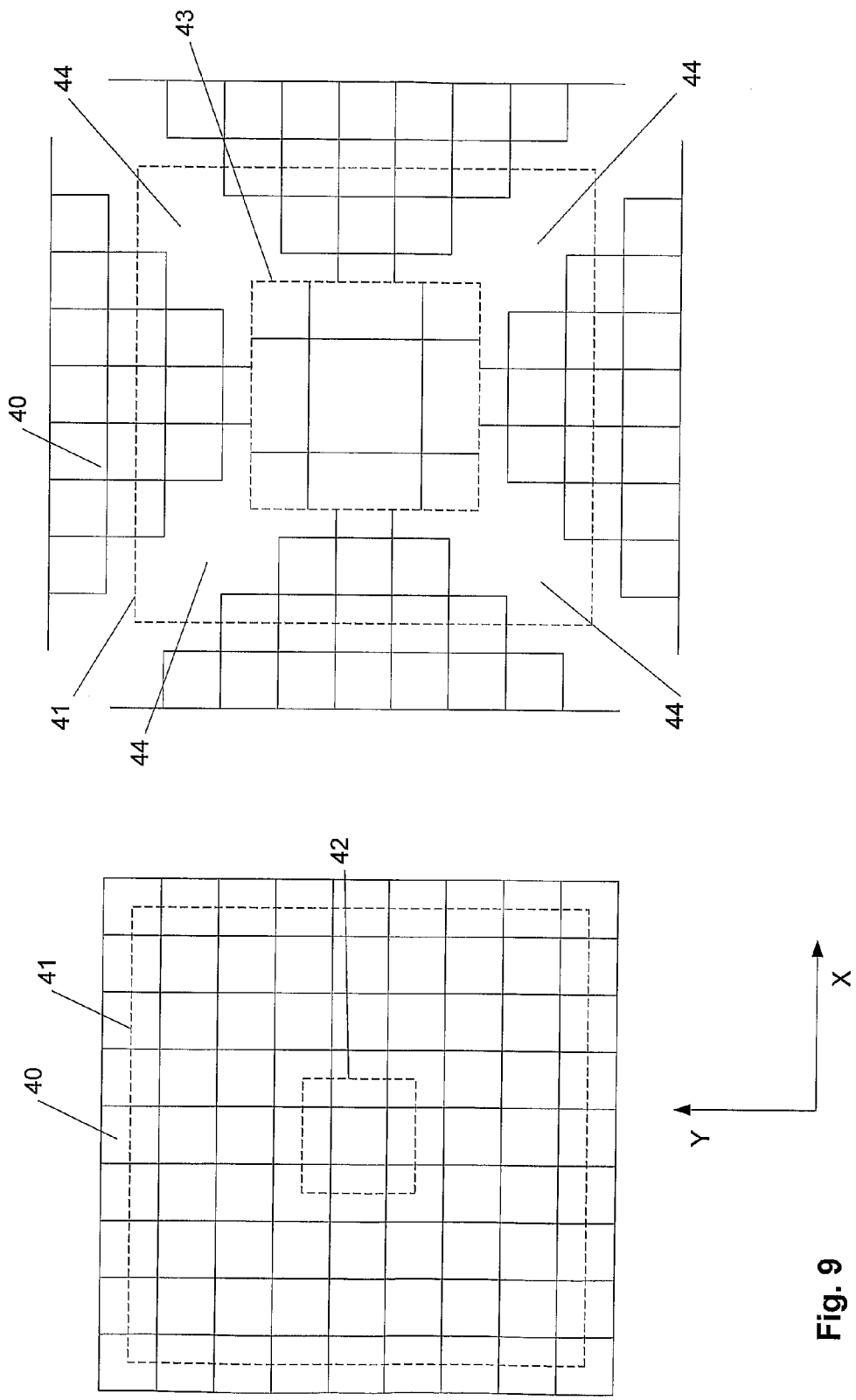
Figure 10:
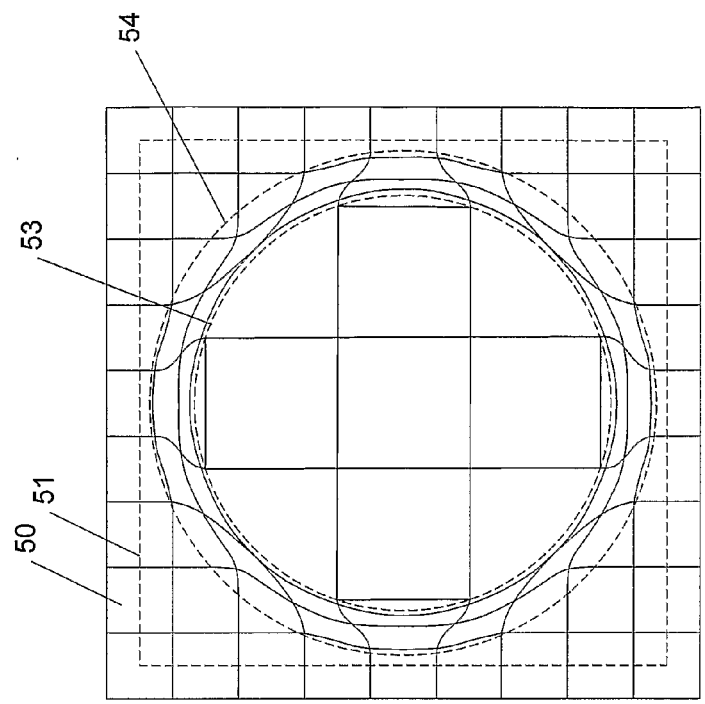
Figure 10:
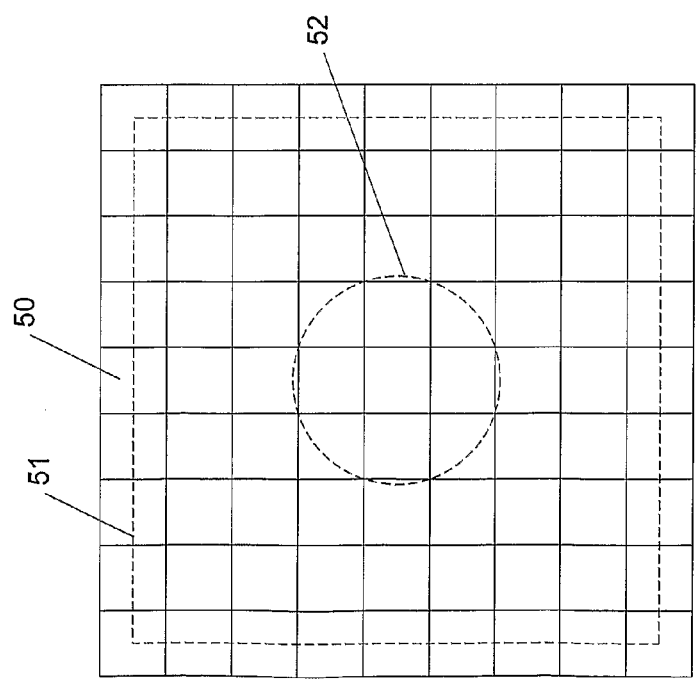
Figure 10:
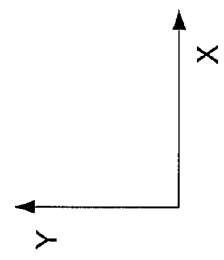

The present invention will now be described, by way of example only, with reference to the accompanying drawings, in which:

FIG. 1 schematically illustrates an image;

FIG. 2 schematically illustrates the image of FIG. 1 containing a zoomed portion in accordance with an embodiment of the prior art;

FIG. 3 schematically illustrates the image of FIG. 1 partially magnified in accordance with an embodiment of the prior art;

FIG. 4 schematically illustrates the image of FIG. 1 partially magnified in accordance with an embodiment of the present invention;

FIG. 5 schematically illustrates the image of FIG. 1 partially magnified in accordance with a further embodiment of the present invention;

FIG. 6 schematically illustrates dimensions of the image illustrated in FIG. 1;

FIG. 7 schematically illustrates dimensions of an image partially magnified in accordance with FIG. 4 or 5;

FIG. 8 is a flow chart of a process for locating and drawing items within the partially magnified images illustrated in FIGS. 4 and 5;

FIG. 9 schematically illustrates an image partially magnified in accordance with another embodiment of the present invention; and FIG. 10 schematically illustrates an image partially magnified in accordance with yet another embodiment of the present invention.

Referring to FIG. 1, this illustrates an image 1, which will be used herein to describe embodiments of the present invention as well as prior art forms of image enlargement. The image 1 comprises a plurality of items 2. The items 2 are arranged in two rows. A top row 3 has nineteen items. A bottom row 4 has nine items grouped into three spaced apart groups of three items. Image 1 extends between outer limits Xstart and Xend. Xstart and Xend are defined by the extremities of the image 1 and do not change position relative to items 2 as portions of the image 1 are magnified, as discussed below. The expression X< >, for instance X.start as used herein relates to units of the image. That is, any dimension beginning with X is related to the image itself, and measured in the units of the image, regardless of the scale at which it may be magnified.

A visible image portion 5 of the image 1 is indicated by the hashed area, and extends between outer limits Xa and Xb. The visible image portion 5 is that part of the image 1, which can be observed in a physical imaging apparatus. Alternatively, in the case of a software implementation of an embodiment of the present invention, the visible image portion 5 is that portion of the image 1 that is displayed by a computer monitor (or other display apparatus known in the art such as a projector). In certain embodiments of the present invention, the visible image portion 5 may cover the whole of image 1 (i.e. Xa is coincident with Xstart and Xb is coincident with Xend). Xa and Xb move relative to items 2 within image 1 as portions of image 1 are magnified in certain embodiments of the present invention. Image portions 6 and 7 are not within the visible image portion 5. In the case of a software implementation, image portions 6 and 7 are outside of the limits of the computer monitor, or other display apparatus.

The visible image portion 5 may comprise only part of the image 1. In FIG. 1 the visible portion 5 is shown as being approximately central within the image 1. However, it will be readily appreciated that the visible portion 5 can be adjusted to display other portions of the image 1. This is schematically illustrated by a slide bar 8, which shows in reduced form a representation 5a of the visible portion 5 and representations 6a, 7a of the non-visible portions 6 and 7. In the case of a software implementation, the visible portion 5 may be moved by dragging portion 5a within the slide bar 8 using a computer mouse, or manipulating arrows 9 and 10 (in a manner which is standard in the art of computer interfaces). The portion of the image 1 displayed in the visible image portion 5 is adjusted accordingly. For FIG. 1 this means that different items 2 or parts of items 2 will be displayed within the visible area 5.

A portion of the visible image portion 5 extends between outer limits Xm and Xn. In FIGS. 2 to 5 the image portion between Xm and Xn is shown magnified or zoomed. It will be appreciated that Xm and Xn can be changed such that a different portion of the image 1 can be shown magnified within the visible image portion 5, for instance by manipulating portion 5a in slide bar 8. However, for the purposes of describing FIGS. 2 to 5 Xm and Xn are considered to be fixed, and therefore do not change position relative to items 2

FIG. 1 also indicates limits Xp and Xq. In FIG. 1 Xp and Xq are coincident with Xm and Xn respectively. For FIGS. 3 to 5, unmagnified image portions displayed within the visible image portion 5 extend from Xa to Xp and from Xq to Xb. The term "unmagnified" as used herein is not intended to limit these portions of the image 1 to being any particular scale, or even a uniform scale. Indeed, in accordance with certain embodiments of the present invention, the or each unmagnified image portion is reduced in scale linearly or non-linearly. Rather, the term is intended to mean that these portions are outside the magnified image portion (between Xm and Xm). Xp and Xq can move relative to items 2 according to the type of magnification used. When a magnified image portion is displayed within the visible image portion 5, if Xm is not equal to Xp and Xn is not equal to Xq (relative to items 2) this means that parts of the unmagnified image portions are being obscured by the magnified image portion.

Referring now to FIG. 2 this illustrates a known form of image enlargement. FIG. 2 shows the image between Xm and Xn zoomed in a first direction indicated by arrow 20 such that it completely fills the whole of the visible image portion 5. Xm is coincident with Xa and Xn is coincident with Xb. No unmagnified portion of the image 1 is within the visible image portion 5. It can be seen that portions 6 and 7 of the image 1 have expanded (Xstart and Xend having moved to the left and the right respectively) to accommodate the additional items 2 no longer displayed within the visible portion 5. Slide bar 8 schematically indicates that portions 6 and 7 have enlarged, while the visible image portion 5 has remained the same size. The top row 3 still contains nineteen items 2 and the bottom row 4 still contains nine items 2. However, in FIG. 2 the visible portion now only displays two and a half items 1 (one on the top row 3 and one and a half on the bottom row 4).

As described above in the introduction, for this conventional zooming the context of the magnified portion between Xm and Xn is not seen in the visible image portion 5.

FIG. 3 illustrates a form of conventional magnification in which the image portion between Xm and Xn is magnified in the first direction 20. The vertically hashed area indicates the magnified portion 30. The magnified image portion 30 from Xm to Xn is schematically illustrated within the slide bar 8 by vertically hashed area 30a. The visible image portion 5 between limits Xa and Xb is the same as for the unmagnified image 1 shown in FIG. 1, relative to items 2. Consequently, image portions 6 and 7 outside of the visible portion 5 are unchanged.

Magnified image portion 30 is shown approximately three times magnified in the first direction 20. As for FIG. 2, two and a half items 2 are visible within the magnified image portion 30 between limits Xm and Xn (one on the top row 3 and one and a half on the bottom row 4). The unmagnified image portions within the visible image portion 5 extend from Xa to Xp (unmagnified image portion 31) and from Xq to Xb (unmagnified image portion 32). Xp and Xq are in the same positions as for FIG. 1. However, as the image portion between Xm and Xn has been magnified in direction 20, Xm is no longer coincident with Xp and Xn is no longer coincident with Xq. Magnified image portion 30 overlaps and obscures parts of unmagnified visible image portions 31, 32. It will be appreciated that, alternatively, magnified image portion 30 could only overlap one or other of the unmagnified image portions 31, 32.

The magnified image portion 30 has obscured parts of the unmagnified image portions 31, 32. As described above, it is particularly disadvantageous that the obscured parts of unmagnified image portions 31, 32 are those that in the unmagnified image 1 shown in FIG. 1 are immediately outside the magnified image portion limits Xm and Xn. Furthermore, as outer limits Xa and Xb of the visible portion 5 are the same distance apart, they have moved, relative to items 2, such that a different number of items 2 are visible within the visible image portion 5. In FIG. 1 eleven items 2 were visible in top row 3 and 4.5 items 2 were visible in bottom row 4 between Xa and Xb. In FIG. 3, only seven items 2 in top row 3 and 3 items 2 in bottom row 4 are visible between Xa and Xb.

Referring now to FIG. 4, this schematically illustrates image 1 incorporating magnified image portion 30 in accordance with an embodiment of the present invention. In accordance with this embodiment of the present invention the unmagnified image portions 31 and 32 within the visible image portion 5 are not overlapped or obscured by the magnified image portion 30.

As before, the magnified image portion 30 extends between Xm and Xn. The magnified image portion 30 has again been magnified in the first direction 20, and is indicated by the vertically hashed area. Magnified image portion 30 is shown approximately three times magnified in the first direction 20. The magnified portion 30 from Xm to Xn is schematically illustrated within the slide bar 8 by vertically hashed area 30a. Two and a half items 2 are visible within the magnified image portion 30 between limits Xm and Xn.

However, in contrast to FIG. 3 the visible image portion 5 between limits Xa and Xb has changed relative to that for the unmagnified image 1 shown in FIG. 1. The unmagnified image portions 31 and 32 have been shifted to the left and the right respectively. Consequently, image portions 6 and 7 outside of the visible portion 5 have been shifted to the left and right respectively and enlarged. The result is that Xp is coincident with Xm and Xq is coincident with Xn. Xp and Xq are in the same positions as for FIG. 1 relative to items 2. Therefore, in contrast to FIG. 3, magnified image portion 30 does not overlap any of the unmagnified image portions 31, 32 within the visible image portion 5.

Outer limits Xa and Xb of the visible portion 5 have changed from FIG. 1, relative to items 2, due to the magnification of image portion 30, the lateral movement of areas 31 and 32 and the fact that the width of the visible image portion 5 is fixed. In FIG. 1 eleven items 2 are visible in top row 3 and 4.5 items 2 are visible in bottom row 4 between Xa and Xb. In FIG. 4, only seven items in top row 3 and 3 items in bottom row 4 were visible between Xa and Xb. However, the total number of items 2 visible in the top row 3 of FIG. 4, including in image portions 6 and 7 is nineteen, and the total number for the bottom row 4 is nine. These are the same as for FIG. 1, the only difference is that some of the items 2 that are visible within the visible image portion 5 in FIG. 1 have now been moved laterally to portions 6 or 7 as shown in FIG. 4. Importantly, those areas of the unmagnified image portions that are adjacent to Xm and Xn are still visible within the visible image portion 5 when the portion of the image between Xm and Xn is magnified. There is, however, a reduction in the total number of items 2 visible between Xa and Xb.

The embodiment of the present invention depicted in FIG. 4 achieves no obscuration of unmagnified image portions by offsetting the unmagnified image portions. Alternatively, FIG. 4 can be considered to have a variable field of view that changes to accommodate change in the relative size of magnified portions of the image within the visible image portion 5. It will be appreciated that instead of offsetting both unmagnified image portions 31 and 32, only one may be offset to accommodate the increase in size of magnified image portion 30. Alternatively, the amount of offsetting may differ.

Referring now to FIG. 5, this schematically illustrates image 1 incorporating magnified image portion 30 in accordance with a further embodiment of the present invention. As for the embodiment of the present invention depicted in FIG. 4, in accordance with this embodiment of the present invention the unmagnified image portions 31, 32 within the visible image portion 5 are not overlapped or obscured by the magnified image portion 30.

As for FIGS. 3 and 4, the magnified image portion 30 extends between Xm and Xn. The magnified image portion 30 has again been magnified in the first direction 20, and is indicated by the vertically hashed area. Magnified image portion 30 is shown approximately three times magnified in the first direction 20. The magnified portion 30 from Xm to Xn is schematically illustrated within the slide bar 8 by vertically hashed area 30a. Two and a half items 2 are visible within the magnified image portion 30 between limits Xm and Xn.

In common with FIG. 3, and in contrast to FIG. 4, the limits of visible image portion 5 Xa and Xb are unchanged relative to items 2 from the limits for FIG. 1. The unmagnified image portions 31, 32 have instead been compressed, such that they display the same number of items 2 as shown in FIG. 1 from Xa to Xm and from Xn to Xb. The only difference is that the items are shown at a reduced scale in the first direction 20. Consequently, image portions 6 and 7 outside of the visible portion 5 are the same as for FIG. 1 and FIG. 3.

Due to the compression of the image in unmagnified image portions 31, 32, as for FIG. 4, Xp is coincident with Xm and Xq is coincident with Xn. Xp and Xq are in the same positions as for FIG. 1 relative to items 2. Again in contrast to FIG. 3, magnified image portion 30 does not overlap any of the unmagnified visible image portions 31, 32.

In FIG. 1 eleven items 2 are visible in top row 3 and 4.5 items 2 are visible in bottom row 4 between Xa and Xb. In FIG. 4, again eleven items 2 are visible in top row 3 and 4.5 items 2 are visible in bottom row 4 between Xa and Xb. Furthermore, the total number of items 2 visible in top row 3 of FIG. 4, including in image portions 6 and 7 is nineteen, and the total number for bottom row 4 is nine, as for FIG. 1.

As for FIG. 4, those areas of the unmagnified image portions that are adjacent to Xm and Xn are still visible within the visible image portion 5 when the portion of the image between Xm and Xn is magnified. In contrast to FIG. 4, there is no reduction in the total number of items 2 visible between Xa and Xb.

The embodiment of the present invention depicted in FIG. 5 achieves no obscuration of unmagnified image portions by compressing the unmagnified image portions. FIG. 5 can be considered to have a fixed field of view between Xa and Xb. It will be appreciated that instead of compressing both unmagnified image portions 31 and 32, only one may be compressed to accommodate the increase in size of magnified image portion 30. Alternatively, the amount of compression may differ.

FIG. 5 shows the compression of unmagnified image portions 31 and 32 being linear between Xa and Xp and Xq and Xb. However, this need not be the case. For instance, it may be that the degree of compression is higher closer to Xp or Xq. Alternatively, the degree of compression maybe higher closer to Xa or Xb.

For the embodiments of the present invention described in relation to FIGS. 4 and 5 it will be appreciated that by varying the positions of Xa and Xb relative to items 2 within image 1, the area of the image depicted may be varied. By varying the positions of Xm and Xn, the portion of the image 1 to be magnified may be varied. Furthermore, the magnification factor of magnified image portion 5 may be varied. However, regardless of changes to these parameters the new Xp position will continue to be coincident with the new Xm position and the new Xq position will continue to be coincident with the new Xn position. In other words, if any of these parameters are varied, the number of items 2 visible, or the scale of the items 2, within the unmagnified image portions 31, 32 will change such that the new magnified image portion does not obscure any of the unmagnified image portions.

Referring now to FIG. 6, this indicates the dimensions of the image 1 and items 2 when there is no magnified image portion 30, (i.e. the whole of the visible image portion 5 is unmagnified).

Each item 2 has an item.start position and an item.end position measured along the X axis. Each item has a width measurement item.width. item.width is equal to item.end minus item.start. The positions item.start and item.end and the measurement item.width are measured in the units of the display apparatus. For the computer monitors, this maybe pixels. Positions Xa and Xb are in the units of the data (for instance time, in the case that the image is a timeline).

The visible image portion 5 has a single width measurement view.width. view.width is equivalent to Xb minus Xa. View.width is measured in pixels.

Referring now to FIG. 7, this indicates the dimensions of the image 1 and items 2 when there is a magnified image portion 30 in accordance with the embodiments of the present invention shown in FIG. 4 or 5.

As for FIG. 6, each item 2 has an Item.start position and an item.end position measured along the X axis in the units of the display (e.g. pixels). Each item has a width measurement item.width. item.width is equal to item.end minus item.start.

As for FIG. 6, the visible image portion 5 has a single width measurement view.width. view.width is equivalent to Xb minus Xa. As for FIG. 6, Xa and Xb are measured in the units of the data, e.g. time. However, the visible image portion 5 now comprises three consecutive areas. The left area is unmagnified image portion 31, and extends from Xa to Xm. The middle area is magnified image portion 30, and extends from Xm to Xn. The right area is unmagnified image portion 32, and extends from Xn to Xb. Each area contains items within said limits. Each area has an area.width measurement, left.width, middle.width and right.width respectively. left.width is equivalent to Xm minus Xa. middle.width is equivalent to Xn minus Xm. right.width is equivalent to Xb minus Xn. The view.width is equal to left.width plus middle.width plus right.width. The area positions (Xa, Xm, Xn, Xb) are measured in the units of the data (e.g. time). The width measurements (area.width) are measured in the units of the display (e.g. pixels).

With reference to FIG. 7, when a magnified image portion 30 is inserted into the visible image portion according to the embodiment of the present invention depicted in FIG. 4 outer limits Xa and Xb need to move relative to the items 2 within the image 1. Xa and Xb are required to move such that the scale of the unmagnified image portions 31, 32 can remain the same without the magnified image portion 30 overlapping the unmagnified image portions 31, 32.

"expansion" is the amount that the magnified image portion 30 has expanded by along the first direction 20 relative to the unmagnified image.

$$\text{expansion}=((Xb-Xa)*(\text{middle.width}/\text{view.width}))-(Xn-Xm)$$

Where:

Xa and Xb are the outer limits of the visible image portion relative to the items within the visible image portion before the magnified image portion are inserted;

(middle.width/view.width) is a ratio determining the proportion of the width of the visible image portion taken up by the magnified image portion; and (Xn−Xm) is the length of the section of image that forms the magnified image portion 30 along the first direction 20 before it is magnified.

If Xa and Xb are both offset by the same amount to accommodate the expansion of the magnified image portion 30 then the new positions of Xa and Xb (Xa.new and Xb.new respectively) are given by:

$$Xa.\text{new}=Xa+(\text{expansion}/2)$$

$$Xb.\text{new}=Xb-(\text{expansion}/2)$$

As stated above, Xa and Xb need not be offset by the same amount.

With reference to FIG. 7, when a magnified image portion 30 is inserted into the visible image portion according to the embodiment of the present invention depicted in FIG. 5 outer limits Xa and Xb are fixed relative to items 2 within the image 1. Unmagnified image portions 31, 32 are required to be compressed such that the scale of the unmagnified image portions 31, 32 can remain the same and without the magnified image portion 30 overlapping the unmagnified image portions 31, 32.

As for the embodiment of the present invention depicted in FIG. 4, for the embodiment of FIG. 5 "expansion" is the amount that the magnified image portion 30 has expanded by along the first direction 20 relative to the unmagnified image.

$$\text{expansion}=((Xb-Xa)*(\text{middle.width}/\text{view.width}))-(Xn-Xm)$$

Where:

Xa and Xb are the outer limits of the visible image portion relative to the items within the visible image portion before the magnified image portion are inserted;

(middle.width/view.width) is a ratio determining the proportion of the width of the visible image portion taken up by the magnified image portion; and (Xn−Xm) is the length of the section of image that forms the magnified image portion 30 along the first direction 20 before it is magnified.

If unmagnified image portions are both compressed by the same amount to accommodate the expansion of the magnified image portion 30 then for unmagnified image portion 31:

$$\text{original width}=Xp-Xa$$

$$\text{compressed width}=(Xp-Xa)-(\text{expansion}*a)$$

$$\text{compression ratio}=((Xp-Xa)-(\text{expansion}*a))/(Xp-Xa)$$

Where "a" is a compression ratio factor

The length of each item 2 within unmagnified image portion is compressed by the compression ratio. Similarly, the compression ratio for unmagnified image portion 32 is given by:

$$\text{compression ratio}=((Xb-Xq)-(\text{expansion}/b))/(Xb-Xq)$$

Where "b" is a compression ration factor

As stated above, the compression need not be linear from Xa to Xp and from Xq to Xb and the degree of compression need not be equal for unmagnified image portions 31, 32. This is taken into account in the compressed width and compression ratio above, and is represented by compression ratio factors a and b: (a+b=1).

As discussed above, the visible image portion 5 can be scrolled within the image 1. To scroll the visible image portion 5 by one unit to the right (i.e. towards Xend), assuming that Xb is not already at Xend, each of Xa, Xb, Xm and Xn need to be incremented by one unit:

$$Xa.\text{new}=Xa+1$$

$$Xb.\text{new}=Xb+1$$

$$Xm.\text{new}=Xm+1$$

$$Xn.\text{new}=Xn+1$$

Similarly, to scroll the visible image portion 5 by one unit to the left (i.e. towards Xstart), assuming that Xa is not already at Xstart, each of Xa, Xb, Xm and Xn need to be decremented by one unit:

$$Xa.\text{new}=Xa-1$$

$$Xb.\text{new}=Xb-1$$

$Xm.new = Xm-1$ $Xn.new = Xn-1$

As discussed above, the magnified image portion 30 can be scrolled within the visible image portion 5. To scroll the magnified image portion 30 by one unit to the right (i.e. towards Xb), assuming that Xn is not already at Xb, both Xm and Xn need to be incremented by one unit:

$Xm.new = Xm+1$ $Xn.new = Xn+1$

Similarly, to scroll the magnified image portion 30 by one unit to the left (i.e. towards Xa), assuming that Xm is not already at Xa, both Xm and Xn need to be decremented by one unit:

$Xm.new = Xm-1$ $Xn.new = Xn-1$

Referring now to FIG. 8, this schematically illustrates in the form of a flow chart the process of generating the position of, and displaying, each item 2 within the visible image portion 5. FIG. 8 shows a nested process loop in which the left area, the middle area and the right area from FIG. 7 are considered in turn, and for each area, each item within image 1 is processed to determine whether any part of that item is visible in that area.

Six further parameters for each area are used in the process of FIG. 8. area.from is the start point of that area in the image. For instance, for the left area, area.from is equivalent to Xa. area.to is the end point of that area in the image. For instance, for the left area, area.to is equivalent to Xm. area.width is the width of the image portion between area.from and area.to. "gap" is the size of the image in the units of the data. Note that area.width is the width of an area as displayed in the image for instance on a computer monitor (for which the units would be pixels). "gap" is the size of an area in the units of the data, and is not necessarily the same as area.width. Hence area.width/gap is a scaling factor allowing, within that area, conversion between the position at an item relative to the start of that area in the units of the data, to the same position in the units of the display.

"start" is the position within an image area at which an item begins. "end" is the position within an image area at which an item ends.

The process begins at step S0 and operation passes to step S1. At S1 a determination is made as to whether there are any more areas to process. If there are no further areas to process then the process ends at step S2. If there are further areas to process then the process passes to step S3. In step S3 gap is calculated for that area.gap=area.to−area.from (in the units of the data displayed in the image). The process then passes to decision step S4.

At S4 a determination is made whether there are any more items within the image to process for that area. If there are no more items within image to process for that area then the process passes back to S1. If there are more items within image to process for that area then the process passes to decision step S5.

At S5 a determination is made whether any part of an item appears within the area. This can be expressed as the logical statement: ((item.start<area.to) AND (item.end>area.from)). If no part of an item appears within the area then the process passes to S4 where the determination is made as to whether there are any more items to process for that area. If part of an item appears within the area then it is determined that at least part of the item must be displayed within that area. Process passes to decision step S6.

At S6 a determination is made whether the item starts before the start of the area, i.e. whether (item.start<area.from). If the item starts before the start of the area then the item is clipped at the start of the area (although part of it may be displayed if there is another area to the left of that area). At step S7 start is set to area.from. If the item does not start before the start of the area then the process passes to step S8, which calculates the start position relative to the start of the area as follows: start=(item.start−area.from)*area.width/gap where area.width/gap is a scaling factor to convert from data units to display units. The process then passes to decision step S9.

At S9 a determination is made whether the item ends after the end of the area, i.e. whether (item.end>area.to). If the item ends after the end of the area then the item is clipped at the end of the area (although part of it may be displayed if there is another area to the right of that area). At step S10 end is set to area.to. If the item does not end after the end of the area then the process passes to step S11, which calculates the end position relative to the start of the area as follows: end=(item.end−area.to)*area.width/gap The process then passes to step S12.

At step S12 the item is drawn between the calculated start and end positions. The process then passes to step S4 where a decision is taken whether there are any more items to process for that area.

Referring now to FIG. 9, this schematically illustrates magnification in two orthogonal directions in accordance with another embodiment of the present invention. Image 40 is shown on the left hand side of FIG. 9 unmagnified. Image 40 comprises an array of squares. A visible image portion 41 is outlined by a dashed square. Portions of image 40 outside of visible image portion 41 are not visible. A portion of image 40 to be magnified is identified by dashed square 42. Image portion 42 is to be magnified in X and Y directions, indicated by the axes.

The embodiment of the present invention depicted in FIG. 9 is similar to that of FIG. 4, in that to avoid overlapping, unmagnified image portions are offset to accommodate the expansion of magnified image portion. Image 40 is shown in the right hand side of FIG. 9, with magnified image portion 43 magnified by approximately two times in the X and Y directions. Those portions of image 40 outside of image portion 42 have been offset in either the X or Y direction, such that a greater proportion of image 40 now lies outside of the visible image portion 41. Gaps 44 now appear between portions of the unmagnified image. The unmagnified image could be stretched such that these gaps are not present.

Referring now to FIG. 10, this schematically illustrates magnification in two orthogonal directions in accordance with another embodiment of the present invention. Image 50 is shown on the left hand side of FIG. 10 unmagnified. Image 50 comprises an array of squares. A visible image portion 51 is outlined by a dashed square. Portions of image 50 outside of visible image portion 51 are not visible. A portion of image 50 to be magnified is identified by dashed circle 52. Image portion 52 is to be magnified in X and Y directions, indicated by the axes.

The embodiment of the present invention depicted in FIG. 10 is similar to that of FIG. 5, in that to avoid overlapping, unmagnified image portions are compressed to accommodate the expansion of magnified image portion. Image 50 is shown in the right hand side of FIG. 10, with magnified image portion 53 magnified by approximately two times in the X and Y directions. Those portions of image 50 outside of image portion 42 and within a band defined between dashed line 53 and dashed line 54 have been compressed in both the X or Y direction, such that outside of line 54 the unmagnified image portions are shown at the original scale. It will be appreciated that band of distortion between lines 53 and 54 could be extended such that it extends throughout the remainder of the visible image portion 51.

For the embodiments of the present invention relating to magnification in two orthogonal directions, the degree of magnification may be different in each direction. Furthermore, the offsetting or compression of unmagnified image portions may be different in each direction. FIG. 9 is illustrated having a square magnified image portion and FIG. 10 is illustrated having a round magnified image portion. However, it will be appreciated that the magnified image portion could be any shape for the embodiments of both FIGS. 9 and 10.

When implemented in computer software, separate display means (usually comprising a computer monitor) are provided, alongside the magnification means used to magnify portions of the image. However, it will be appreciated that when implemented with optical lenses no separate display means may be required, as it may be possible to view the magnified and unmagnified image portions simply by looking through the magnification means.

One application of embodiments of the present invention is for magnifying an image comprising a linear array or series of data. For instance, the image could comprises a time line, for which it is desirable to be able to magnify certain sections of the time line without losing the context of the magnified section by obscuring adjacent portions of the time line. The embodiments of the present invention relating to magnification in a single direction are particularly applicable to this. The time lines may in particular relate to simulation system software.

Other modifications and applications of the present invention will be readily apparent to the appropriately skilled person, without departing from the scope of the appended claims.

The invention claimed is:

1. An apparatus for magnifying an image, the apparatus comprising:
    means for presenting a visible image portion of the image;
    magnification means arranged to magnify part of the image to form a magnified image portion and unmagnified image portions, said magnified and unmagnified image portions together containing all the image information contained within the image;
    wherein at least part of the magnified image portion and a visible part of the unmagnified image portions are within the visible image portion and the magnified image portion does not obscure the unmagnified image portions as a result of shifting the visible part of the unmagnified image portions relative to the magnified image portion, wherein non-visible portions outside of the visible image portion are also shifted relative to the magnified image portion by the same amount as the visible part of the unmagnified image portions, and the non-visible portions are not presented by the means for presenting the visible image portion of the image;
    wherein the visible part of the unmagnified image portions comprises a first unmagnified image portion and a second unmagnified image portion, and further wherein the first unmagnified image portion is shifted in a first dimension and wherein the second unmagnified image portion is shifted in a second dimension so that at least one gap is created between the first unmagnified image portion shifted in the first dimension and the second unmagnified image portion shifted in the second dimension, wherein no gap existed between the first unmagnified image portion and the second unmagnified image portion before the first unmagnified image portion and the second unmagnified image portion are shifted; and
    wherein the image comprises a time line.

2. An apparatus according to claim 1, wherein the whole of the magnified image portion is within the visible image portion.

3. An apparatus according to claim 1, wherein the magnified image portion is located between said first and second unmagnified image portions.

4. An apparatus according to claim 3, wherein said first and second unmagnified image portions are moved by different amounts relative to the magnified image portion.

5. An apparatus according to claim 3, wherein said first and second unmagnified image portions are compressed by different amounts.

6. An apparatus according to claim 1, wherein the visible image portion is moveable within said image.

7. An apparatus according to claim 1, wherein said magnified image portion is moveable within said visible image portion.

8. An apparatus according to claim 1, wherein the magnification means is arranged to magnify said part of the image in a first direction.

9. An apparatus according to claim 1, wherein the magnification means is arranged to magnify said part of the image in a first direction and a second direction orthogonal to the first direction.

10. An apparatus according to claim 9, wherein said part of the image is magnified by different amounts in said first direction and said second direction.

11. An apparatus according to claim 1, wherein said magnified image portion is rectangular.

12. An apparatus according to claim 1, wherein said magnified image portion is substantially elliptical.

13. An apparatus according to claim 1, further comprising:
    means for receiving a user specification of a part of the presented image to be magnified;
    wherein the magnification means is arranged to use said user specification to generate said magnified and unmagnified image portions and wherein said presented image comprises a first quantity of information, and said visible image portion comprises a second lesser quantity of information.

14. An apparatus according to claim 1, wherein each unmagnified image portion is compressed within said visible image portion such that within the visible image portion the magnified image portion does not obscure the unmagnified image portions.

15. An apparatus according to claim 14, wherein each unmagnified image portion is compressed by a greater or lesser amount further away from the magnified image portion.

16. An apparatus according to claim 14, wherein each unmagnified image portion is only compressed over part of said part of the unmagnified image portion within the visible image portion.

17. An apparatus according to claim 1, wherein the time line is a time line suitable for use within a simulation system.

18. A method for magnifying an image, the method comprising:

displaying a visible image portion of the image on a display, the display having limits within which to display a visible image;

magnifying part of the image to form a magnified image portion and an unmagnified image portion, said magnified and unmagnified image portions together containing all the image information contained within the image;

wherein at least part of the magnified image portion and a visible part of the unmagnified image portion are within the visible image portion and the magnified image portion does not obscure the unmagnified image portion as a result of shifting the visible part of the unmagnified image portion right or left relative to the magnified image portion;

wherein the unmagnified image portion comprises a first unmagnified image portion and a second unmagnified image portion, and further wherein the shifting is of the first unmagnified image portion in a first direction and further including shifting the visible part of the second unmagnified image portion in a second direction such that gaps appear between the first and second unmagnified image portions, wherein there were no gaps between the first unmagnified image portion and the second unmagnified image portion before the shifting; and wherein a time line is included in the image.

19. A method according to claim 18, wherein the whole of the magnified image portion is within the visible image portion.

20. A method according to claim 18, wherein the magnified image portion is located between said first and second unmagnified image portions.

21. A method according to claim 18, further comprising moving the visible image portion within the image.

22. A method according to claim 18, further comprising moving the magnified image portion within the visible image portion.

23. A method according to claim 18, further comprising magnifying said part of the image by different amounts in said first direction and said second direction.

24. A method according to claim 18, wherein said magnified image portion is rectangular.

25. A method according to claim 18, wherein said magnified image portion is substantially elliptical.

26. A method according to claim 18, further comprising:
presenting the image; and receiving a user specification of a part of the presented image to be magnified;
wherein magnifying part of the image comprises using said user specification to generate said magnified and unmagnified image portions and wherein said presented image comprises a first quantity of information, and said visible image portion comprises a second lesser quantity of information.

27. A method according to claim 18, further comprising moving said first and second unmagnified image portions by different amounts relative to the magnified image portion.

28. A method according to claim 18, further comprising compressing each unmagnified image portion within said visible image portion such that within the visible image portion the magnified image portion does not obscure the unmagnified image portions.

29. A method according to claim 28, further comprising compressing each unmagnified image portion by a greater or lesser amount further away from the magnified image portion.

30. A method according to claim 28, further comprising compressing each unmagnified image portion only over part of said part of the unmagnified image portion within the visible image portion.

31. A method according to claim 18, further comprising compressing said first and second unmagnified image portions by different amounts.

32. A method according to claim 18, wherein the time line is a time line suitable for use within a simulation system.

33. A computer apparatus for magnifying an image, the apparatus comprising:
a program memory storing processor readable instructions; and
a processor configured to read and execute instructions stored in said program memory,
wherein the processor readable instructions comprise instructions controlling the processor to carry out a method, the method comprising:
displaying a visible image portion of the image on a display, the display having limits within which to display a visible image, the image having a time line;
magnifying part of the image to form a magnified image portion and an unmagnified image portion, the magnified and unmagnified image portions together containing all the image information contained within the image, the unmagnified image portion being at an original scale of the image;
wherein at least part of the magnified image portion and a visible part of the unmagnified image portion are within the visible image portion and the magnified image portion does not obscure the unmagnified image portion as a result of shifting the visible part of the unmagnified image portion relative to the magnified image portion;
wherein the shifting is of a first section of the visible portion of the unmagnified image portion in a first direction and a second section of the visible portion of the unmagnified image portion is shifted in a second direction to form at least one gap between the first and second sections of the visible portion of the unmagnified image portion, further wherein no gap existed between the first section and the second section before the shifting.

34. The computer apparatus of claim 33, wherein the time line is a time line suitable for use within a simulation system.

35. A method for magnifying an image, the method comprising:
displaying a visible image portion of the image on a display, the display having limits within which to display a visible image;
magnifying part of the image to form a magnified image portion and unmagnified image portions, said magnified and unmagnified image portions together containing all the image information contained within the image;
wherein at least part of the magnified image portion and a visible part of the unmagnified image portions are within the visible image portion and the magnified image portion does not obscure the unmagnified image portions as a result of shifting the visible part of the unmagnified image portions relative to the magnified image portion, wherein non-visible portions outside of the visible image portion are also shifted relative to the magnified image portion by the same amount as the visible part of the unmagnified image portions, and the non-visible portions are not presented by the means for presenting the visible image portion of the image;

wherein the visible part of the unmagnified image portions comprises a first unmagnified image portion and a second unmagnified image portion, and further wherein the first unmagnified image portion is shifted in a first dimension and wherein the second unmagnified image portion is shifted in a second dimension so that at least one gap is created between the first unmagnified image portion shifted in the first dimension and the second unmagnified image portion shifted in the second dimension; and
wherein the image comprises a time line.

* * * * *